(12) United States Patent
Reeves et al.

(10) Patent No.: US 6,606,027 B1
(45) Date of Patent: *Aug. 12, 2003

(54) VEHICLE SAFETY SENSOR SYSTEM (76) Inventors: Michael J. Reeves, 69 Jones Sawmill Rd., Attalla, AL (US) 35954; Ronda K. Reeves, 69 Jones Sawmill Rd., Attalla, AL (US) 35954

( * ) Notice: Subject to any disclaimer, the term of this patent is extended or adjusted under 35 U.S.C. 154(b) by 0 days.

This patent is subject to a terminal disclaimer.

(21) Appl. No.: 09/718,105

(22) Filed: Nov. 21, 2000

Related U.S. Application Data (63) Continuation-in-part of application No. 09/395,433, filed on Sep. 14, 1999, now Pat. No. 6,211,778.
(60) Provisional application No. 60/100,207, filed on Sep. 14, 1998.

(51) Int. Cl.[7] .................................. B60Q 1/00
(52) U.S. Cl. ................. 340/436; 340/435; 340/903; 340/942; 340/943
(58) Field of Search ................. 340/436, 435, 340/903, 942, 943

(56) References Cited

U.S. PATENT DOCUMENTS

| | | | |
|---|---|---|---|
| 4,528,563 A | * | 7/1985 | Takeuchi ............. 340/903 |
| 4,920,520 A | | 4/1990 | Gobel et al. |
| 5,028,920 A | | 7/1991 | Dombrowski |
| 5,276,426 A | | 1/1994 | LoBello |
| 5,281,947 A | | 1/1994 | Durley et al. |
| 5,315,285 A | | 5/1994 | Nykerk |
| 5,389,912 A | * | 2/1995 | Arvin ............. 340/435 |
| 5,424,713 A | | 6/1995 | Thompson et al. |
| 5,455,557 A | * | 10/1995 | Noll et al. ............. 340/431 |
| 5,574,426 A | | 11/1996 | Shisgal et al. |
| 5,635,922 A | * | 6/1997 | Cho et al. ............. 340/903 |
| 5,710,553 A | | 1/1998 | Soares |
| 5,712,640 A | | 1/1998 | Andou et al. |
| 5,734,336 A | | 3/1998 | Smithline |
| 5,767,793 A | | 6/1998 | Agravante et al. |
| 5,828,320 A | * | 10/1998 | Buck ............. 340/942 |
| 6,069,558 A | * | 5/2000 | Kershaw ............. 340/435 |
| 6,211,778 B1 | * | 4/2001 | Reeves ............. 340/436 |

* cited by examiner

*Primary Examiner*—Daniel J. Wu
*Assistant Examiner*—Tai T. Nguyen
(74) *Attorney, Agent, or Firm*—Alston & Bird, LLP (57) ABSTRACT

A vehicle safety sensor allows a vehicle operator such as a truck driver to detect the presence of adjacent objects in order to avoid collision with same. In one embodiment, three detection ranges providing feedback with various lights and sounds can be used with separate sensors, with some sensors automatically made "live" upon reversing or turning of the vehicle, and some sensors being manually activated, such as when a overpass is encountered.

15 Claims, 5 Drawing Sheets

When the line on the screen inside the circle is level, the rear of the vehicle is square with the object it is backing up to

Fig. 5B

When right side of the trailer is coming in too steep, the line shows the angle that the trailer is coming into the dock or wall

Fig. 5C

When left side of the trailer is coming in too steep, the line shows the angle that the trailer is coming into the dock or wall

VEHICLE SAFETY SENSOR SYSTEM

CROSS-REFERENCE TO RELATED APPLICATIONS

This application is a continuation-in-part of and claims the benefit and priority of U.S. patent application Ser. No. 09/395,433 filed Sep. 14, 1999, now U.S. Pat. No. 6,211,778, which itself claimed priority of U.S. provisional patent application Ser. No. 60/100,207, filed Sep. 14, 1998.

TECHNICAL FIELD OF THE INVENTION

The present invention relates to moving vehicles, and particularly relates to a sensor and method of using same which allows a vehicle operator to avoid potential accidents through the avoidance of obstacles which might otherwise go unseen.

BACKGROUND OF THE INVENTION

When a vehicle operator, particularly a large vehicle operator such as a truck driver, operates his or her particular vehicle, of paramount concern is the avoidance of accidents due to collision of the vehicle with other moving or stationary objects. While the prior art has attempted to address such concerns, there is always room for improvement.

SUMMARY OF THE INVENTION

The present invention overcomes deficiencies in the prior art by providing a method and apparatus for providing visual and/or auditory warning to a vehicle operator to allow same to avoid collisions.

Generally described, the present invention provides a method and apparatus which provides more than one different visual or auditory signal to the operator of a vehicle, depending upon the vicinity of a potential collision location.

More particularly described, the present invention provides a method and apparatus for assisting a vehicle operator in avoiding collisions, which includes both automatic and manual sensor energizement features.

Therefore it is an object of the present invention to provide an improvement vehicle safety device.

It is a further object of the present invention to provide an improved vehicle safety sensor device which is easily understood.

It is a further object of the present invention to provide an improved vehicle safety sensor device which is easily installed.

It is a further object of the present invention to provide an improved vehicle safety sensor device which can be manually energized.

It is a further object of the present invention to provide an improved vehicle safety sensor device which can be automatically energized.

It is a further object of the present invention to provide an improved vehicle safety sensor device which can be automatically energized upon the placement of the vehicle in reverse.

It is a further object of the present invention to provide an improved vehicle safety sensor device which can be automatically energized upon use of a vehicle turn signal.

It is a further object of the present invention to provide an improved vehicle safety sensor device which provides both visual and auditory warnings.

It is a further object of the present invention to provide an improved vehicle safety sensor device which allows for interaction with a computer such as a logging computer or other computer used with satellites.

Other objects, features, and advantages of the present invention will become apparent upon reading the following detailed description of the preferred embodiment of the invention when taken in conjunction with the drawing and the appended claims.

DETAILED DESCRIPTION OF THE INVENTION

Reference is now made to the figures, in which like numerals indicate like elements throughout the several views.

Figure 1:
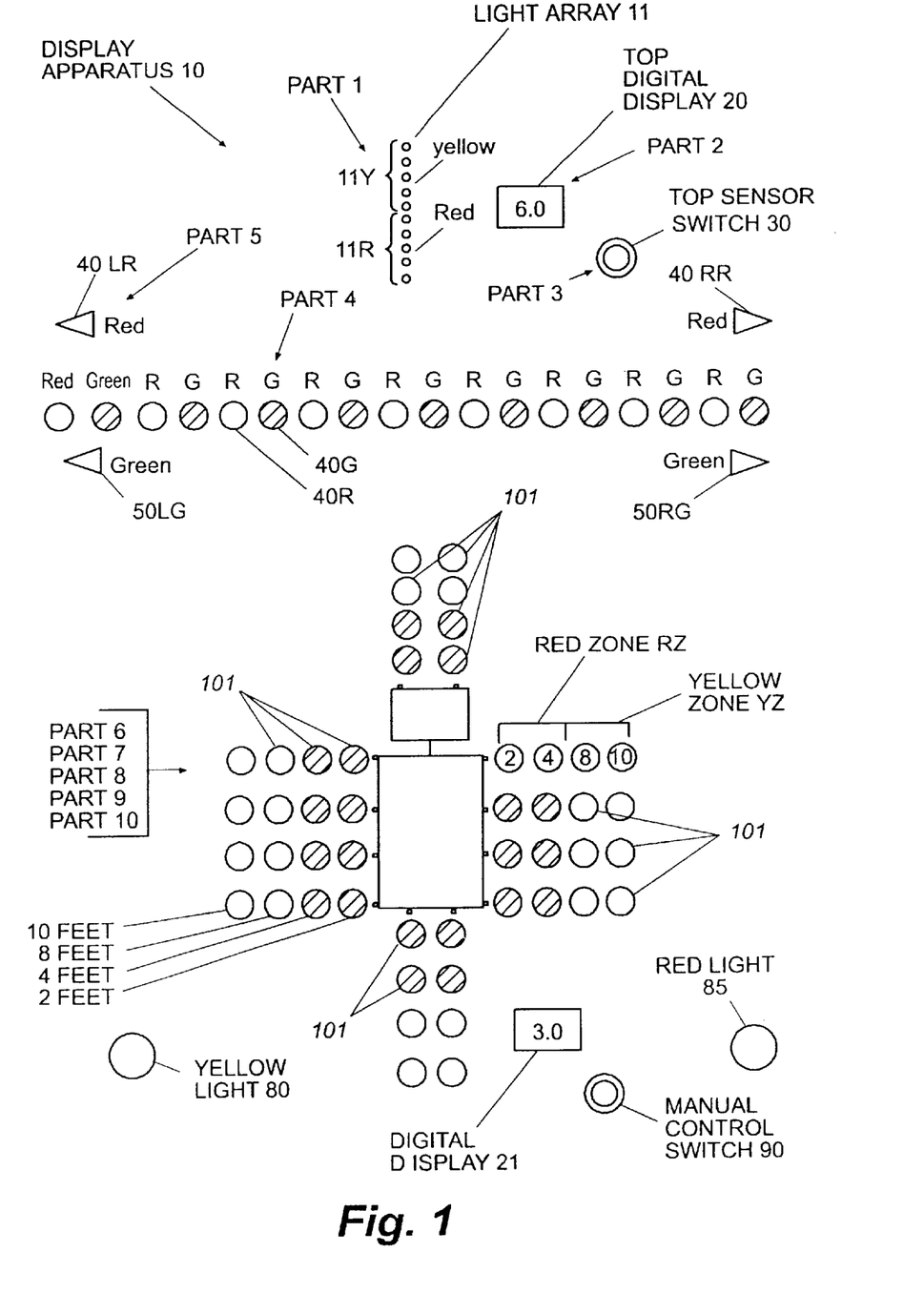
FIG. 1 is an illustrative view of a display configuration such as would be used in a display device in a conventional tractor-trailer environment.

Generally described, the present invention includes the use of a central display apparatus 10 (see FIG. 1) which operates in conjunction with one or more remote sensors 100. FIG. 1 is an illustrative view of a display configuration such as would be used in a display device in a conventional tractor-trailer environment.

The sensors sense the vicinity of foreign objects, so that the display apparatus, located near the driver; provides an adequate warning to a truck or other vehicle driver.

A display apparatus as shown in FIG. 1 is used which can include at least one meter that consists of lights and sound to alert the driver of the area in which there is an object or vehicle that he/she cannot see.

The display apparatus includes the following features:

light array 11Y (yellow)
light array 11R (red)
top digital display 20
digital display 21
top sensors switch 30
horizontal array of lights 40G, 40R
red indicators 40LR, 40RR
green indicators 50LG, 50RG
yellow light 80
red light 85
sensor lights 101
manual control switch 90

Figure 2:
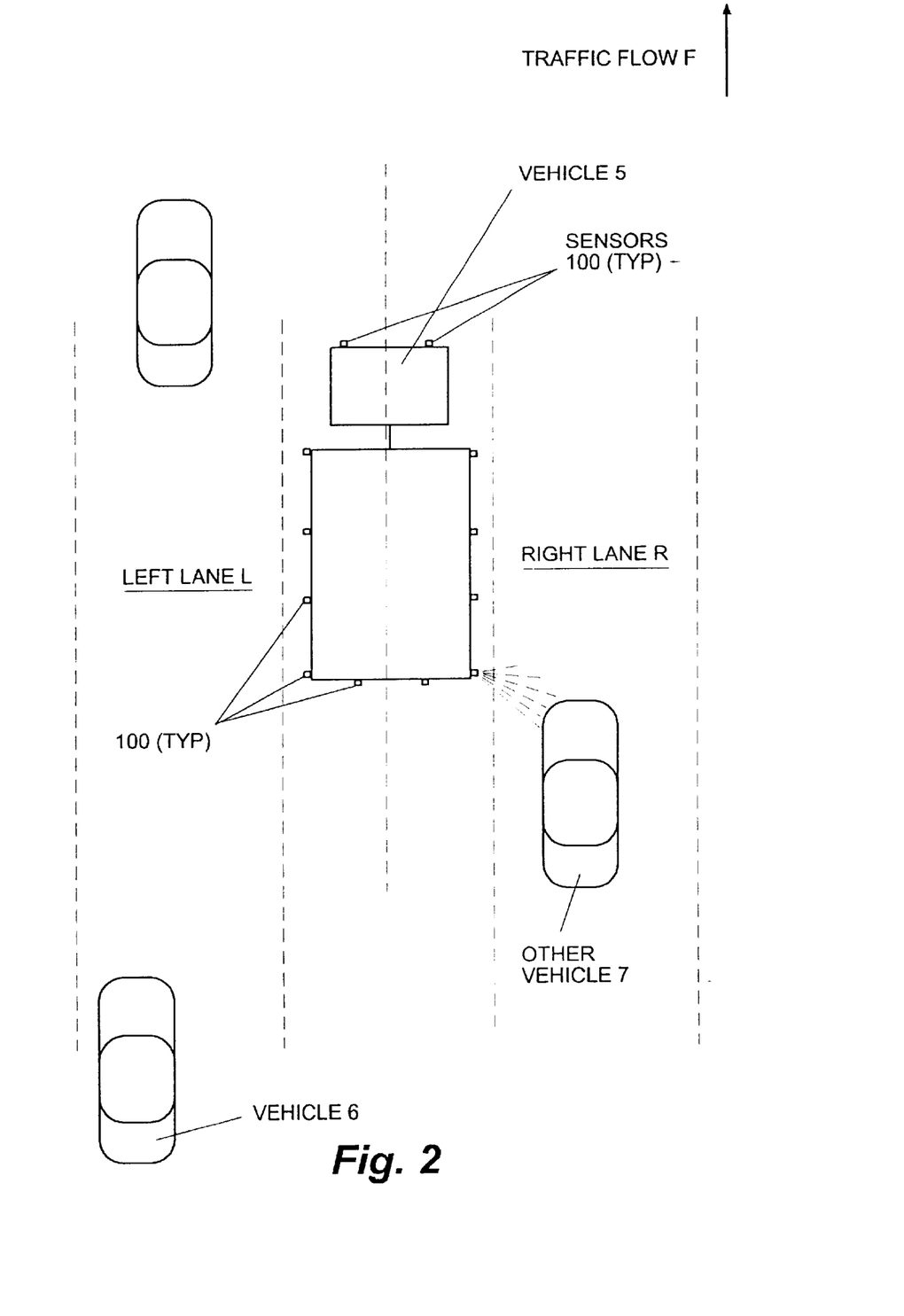
FIG. 2 is a view illustrating the sensors 100 on a vehicle 5 in a lane, said lane having a relatively left lane L and a relative right lane R. Other vehicles 6 and 7 are shown in the left and right lanes, respectively. Other vehicle 7 is in the way of the vehicle 5 should it turn to right lane R.
Figure 3:
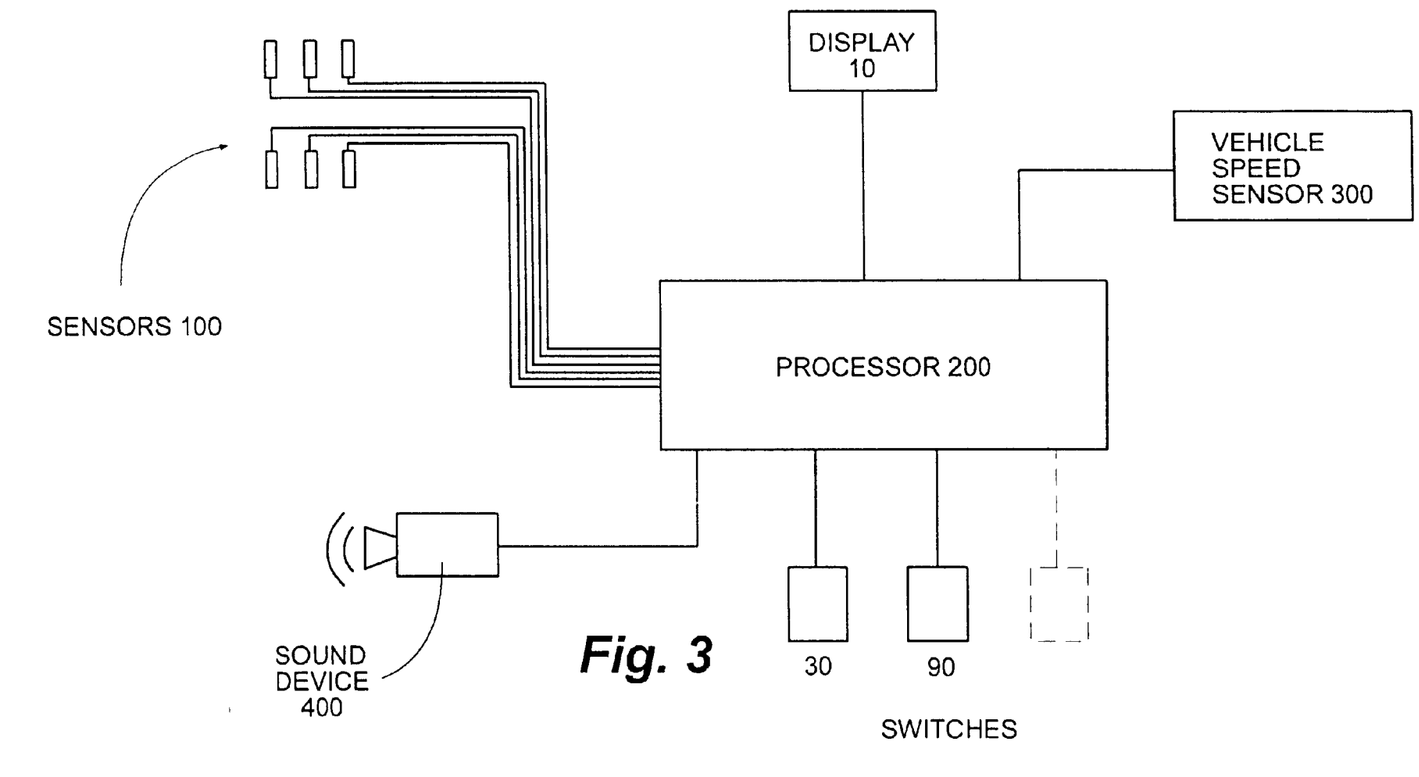
FIG. 3 is a diagrammatic view showing the relative instruction and logic paths of various elements used within the overall invention, including sensors 100, the display 10, vehicle speed sensor 300, a sound device 400, and switches 30, 90.

Distance proximity sensors 100 (see FIG. 2) such as known in the art can be located at various points on the tractor as well as the trailer to enhance the driver's awareness of vehicles and/or objects around him/her. Suggested placement of sensors will be, the rear of the vehicle, the right and left sides, and the top, front, and rear of the trailer. This is not the only locations the sensors can be located, these are the most critical areas. As discussed later in this application, the sensors on the front, (near the turn signals) sides, and rear cause lights 101 to light up either in the yellow zone (8 feet and 10 feet lights) or the red zone (2 feet and 4 feet lights).

For purposes of this discussion, the "energizement" or "activation" of a sensor means it is being turned on so that sensing is possible; deactivation or "de-energizement" means it is being turned off so that sensing is not possible.

Individual features of the overall invention will now be discussed, generally grouped in "parts".

Top of Trailer

Part 1—This is a bead of blinking lights for the top of the trailer. These lights are yellow and red and come on when the sensors are manually activated and the top of the trailer is within a predetermined distance of an object. The yellow lights represent a caution, and is accompanied by a voice warning, alerting the driver of the object in the path of the top of the trailer. The red lights represent danger zone, and are accompanied by a voice command, alerting the driver to stop the vehicle before contact with the object.

Part 2—This is a digital display of the distance between the top of the trailer and the object being measured. The method of measurement can be variably determined in design, and can as known in the art.

Part 3—This represents the on and off switch for manual control for the sensors on the top of the trailer. This switch allows for selective manual control of the top sensors. The sensors can be placed on the top of the trailer as desired, but can be on the top front face, middle top face, and rear top face.

Lane Changing

Part 4—This represents a bead of red and green blinking lights. When the driver turns on his or her indicators to change lanes, the sensor on the side being turned to and the rear sensors will be activated. If all is clear, all of the green lights 40G (or, alternately, the half of the green lights on the side the driver is turning) will light up and blink with normal blinking sound. If there is an object in the predetermined zone, all of the red lights 40R (or alternately the half of the red lights on the side the driver is turning) will light up and blink rapidly and a voice command will alert the driver not to change lanes.

Part 5—This represents a red and green blinking arrow for each side of the tractor and trailer. When the driver turns on his or her indicator to change lanes, the sensors will be activated, if all is clear, the green arrow will blink with normal blinking sound. If there is an object in the predetermined zone, the red arrow will blink rapidly along with a rapid low pitch beeping sound, and a voice command will alert the driver not to change lanes. This works in conjunction with Part 4.

City Mode-Turns

Part 6—While maneuvering the truck through cities, an automatic city mode will be activated at a predetermined speed. When the turning indicators are turned on, city mode will detect objects on the side of the trailer in which the vehicle is turning. This will deactivate the previous voice command that detects objects while changing lanes on interstate at high speeds. Voice warning in conjunction with the red arrows 40RR and 40LR and red lights 40R will be activated when objects enter the red zone. The screen will automatically come on to show the driver the objects in the red zone. These objects will appear in red, in the lights 101, and digital display 21 will show the distance the closest remote object is from the trailer. When the vehicle accelerates to a predetermined speed, city mode will deactivate and voice command will reactivate for lane changing.

Maneuvering to Tight Places

Part 7—Before maneuvering the vehicle in tight places, press the manual switch 90 on the bottom of the screen to activate all sensors around the vehicle and turn the screen on. It may be noted that this time is the only time all the side sensors (not the top sensors) come on. Lights representing the object will appear in yellow and red as they enter the predetermined distance for each zone. These lights/objects will show individual digital distance by the digital display 21. When objects enter the yellow zone, the yellow light 80 at the bottom of the screen will also come on. When objects on the screen enter the red zone the voice warning will alert the driver that objects are in the red zone. At a predetermined distance, red objects will rapidly blink and voice command will alert the driver to stop the vehicle. The red light 85 at the bottom of the screen will come on when the objects enter the red zone, and will also begin to blink rapidly when the object/lights blink.

Part 8—Built in VSS will be memory for storing information concerning the voice command mode. Once an object enters the voice command mode, VSS will document the speed, time, date, drivers code #, and place of possible impact.

The device will work in conjunction with on-board computers such as those that so many companies are using to log their driver as well as with satellite systems used therewith. When a vehicle or object causes voice command mode, the "VSS" will send a signal to the trucks computer, that will log information such as but not limited to the time, date, mileage, location on the trailer and the drivers employee # (which will already be in the computer).

Backing

Part 9—When the vehicle is placed in reverse, the rear sensors will automatically be activated and the screen will come on. It may be noted that this and during the "tight places" mode and during "stop and go" mode and during "parking mode" and "squaring mode" are times these sensors come on. When an object enters a predetermined zone, a voice warning will alert the driver that objects are in the rear. Objects/lights will appear in red on the screen and the digital display 21 will show individual digital distance. If the objects enter a predetermined distance, voice command will alert the driver to stop, and will document the event into the VSS memory.

Stop and Go

Part 10—When the vehicle slows to a predetermined speed to zero mph, the sensors will be activated, voice warning will occur twice if an object is in the rear, within a certain distance. If the vehicle moves after stopped, or if the distance of the object behind changes, voice warning will occur again. This will eliminate the problem commercial vehicle drivers have while letting their foot relax on the brake while stopped on an up grade. The screen will automatically come on and display the object and it's digital distance when voice warning is activated. After the vehicle exceeds it's predetermined speed, the screen and the sensors will then go off. This will keep the driver aware of what is behind him in slow traffic areas.

Squaring Mode

This could be an addition to the backing mode discussed above. When backing up, using the two sensors on the rear, a line can be drawn on the graphic LCD display simulating the rear wall or loading dock, and the angle of the line would aid in squaring up to the loading dock, etc.

The purpose or advantage of this feature is apparent. When multiple trailers are docking, one trailer may not be square on the dock. When drivers are backing up, they can rarely see what is behind them, only the sides. If the tractor is jacked, they can only see one side, but rarely the back This makes it difficult for the next incoming trailer to gauge how to back in squarely. When the next trailer comes in, there also may be a space between those two trailers, but neither of them are square. Then when the next trailer comes in, and this is the only spot open, he is going to try to dock his trailer between two trucks that have already crowded his space. Often times when this is the case, trailers are damaged and doors are torn off. the squaring feature lets the driver know he is squaring onto the dock.

As will be readily understood, when the operator of the vehicle is backing the vehicle up to a loading dock or back to a wall, it is often desirable to know how straight the trailer is being backed in relative to the flat surface typically presented by the dock or wall. The present invention provides an indicator which provides some visual indication of the extent of the angle of the trailer that may be off from the desired "square" orientation. The squaring mode contemplates using at least two rearwardly-facing sensors, and comparing the distances of the two relative to an obstacle having a flat surface needed to "square" to (such as a wall, loading dock, etc.).

Reference is now made to FIGS. 4 and 5A–5C.

Figure 4:
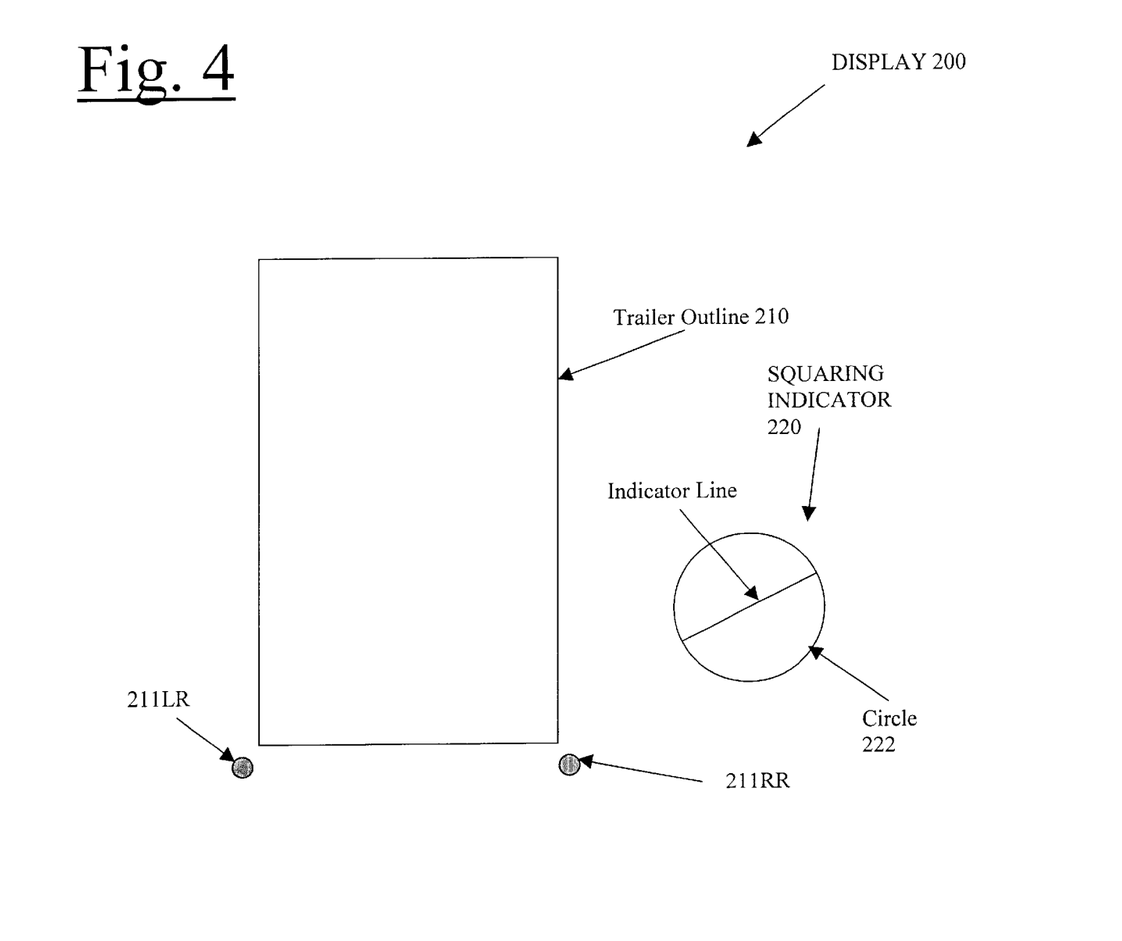
FIG. 4 shows a display 200 which includes a trailer outline 210 and a squaring indicator 220.

FIG. 4 shows a display 200 which includes a trailer outline 210 and a squaring indicator 220.

The trailer outline includes proximate lights such as 211LR and 211RR, and they will be green. The lights will blink in accordance with the angle of the line 221 inside the circle 222 of the squaring indicator 220. If the left side is coming in to soon, both lights 211LR, 211RR will blink slow to fast, depending on the severity of the angle (high angle, fast blinking). If lights are solid (no blinking) the trailer is at least substantially "square".

It should be understood that other outlines besides the circle outline may be used (square or rectangular for example). The outline may not be used at all, only the variably inclined line, with or without a reference "horizon"-type line.

Figure 5A:
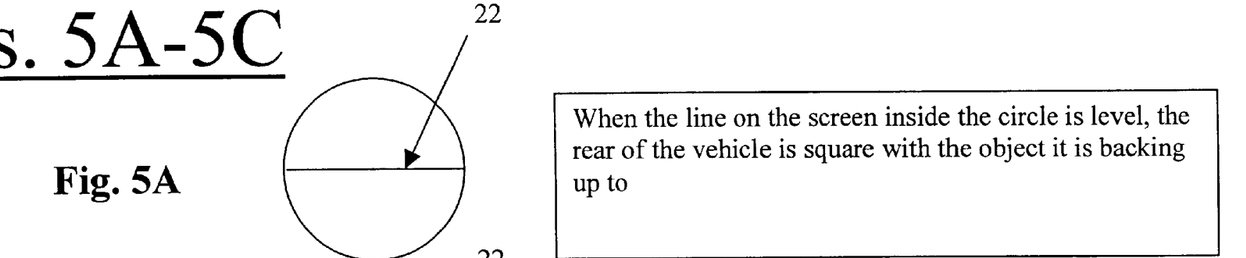
FIGS. 5A–5C are similar illustrations of different displays of a squaring indicator 220 according to the present invention.
Figure 5B:
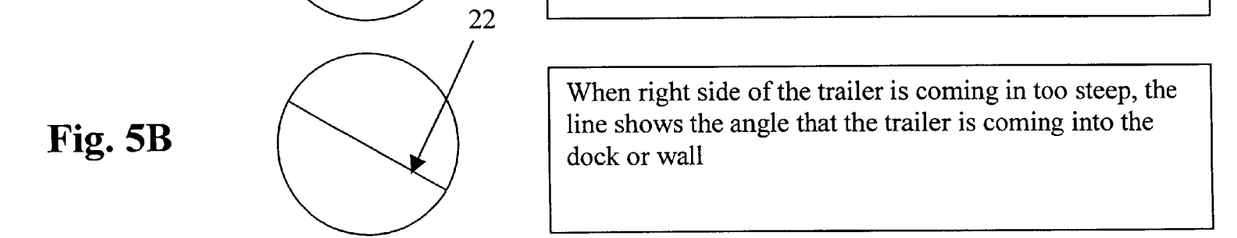
Figure 5C:
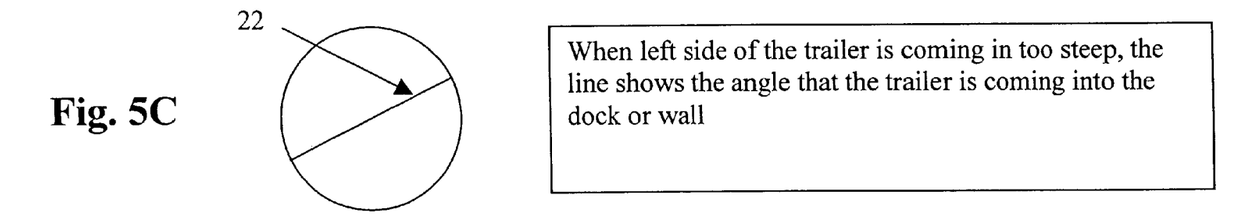

As shown in FIGS. 5A–5C, the variable inclination line (a.k.a. the squaring indication line) is level in the circle when the trailer is "square" as shown in FIG. 5A. If the right side is coming in too steep the line will tilt as shown in FIG. 5B, and vice versa with respect to FIG. 5C. The inclination of the line will vary with the severity of the angle of the trailer, but the exact angle of the line 221 may or may not be the trailer's angle to the rear wall/surface.

The present invention also provides a vehicle safety system, the system for use with a vehicle for use by an operator on a roadway, the vehicle safety system comprising a presence sensor located proximate the exterior of the vehicle, the sensor configured for sensing the presence of a remote object a distance from the vehicle and for providing a sensor signal if such an object is sensed, a signal processing and generating unit for processing said signals from said presence sensor and for generating an advisory signal to said operator in response to said presence sensor signal; and a memory storage device for storing and logging a plurality of advisory signals for later review.

Side Trailer Mode:

The purpose of this mode is to allow the driver to check for vehicles on the sides of his truck when going down the highway without causing an action from other vehicles around the truck. This mode can be used on interstate, high speed or low, and can be used in tight places. This mode prevents the driver from having to turn on indicators (lane changing mode) just to see if there is an object beside him. However, this mode is manual and lane changing mode will override this mode when activated. When this mode is activated and there is a vehicle beside the truck, VSS can alert the driver with a voice warning (Objects are on your right/left side) every four seconds until the object is gone, and the LCD screen can display where the object is located and the distance it is from the truck.

Parking Mode:

The purpose of this mode it to protect the operator (a.k.a. "driver") from being falsely accused of an accident or hit and runs by other vehicles. This is used when the driver is not going to be in or working around the truck, otherwise it would pick him up. This mode promotes safety by pulling both brakes and using fourways when parked. Before the driver leaves the truck, he must first pull both brakes then his fourways, then press parking mode. All sensors around the truck will be activated just as maneuvering mode but the truck will not be moving. This mode will monitor starting at a predetermined distance and will appear on the LCD screen when an object appears in the possible impact zone. VSS can record and replay the possible impact, location on the truck of the possible impact, and the drivers employee or ID#. VSS can also alert the driver with voice warning via a personal device such as a cell phone, pager, radio, or other suitable wireless device carried by the driver. There can be used a few second delay before notifying the driver of a possible impact, which can prevent false alarms.. In other words, possible impact will have to be recognized for a predetermined period of time (e.g. 15 seconds) before the operator will be notified. However the VSS will always be recording information.

Definitions

Voice Warning should be understood as a prescribed message alerting the driver that an object/s has entered into a predetermined distance between his/her vehicle and the object/s being measured. Messages may vary depending on the area of the vehicle that is being monitored.

Voice Command should be understood as a prescribed message commanding the driver to cease the action he/she is in the process of, (Ex. backing, lane changing, maneuvering, etc.) due to the possibility of contact with an object if they proceed. Messages may vary depending on the area of the vehicle that is being monitored.

Miscellaneous

Sensors shown on the drawing, are for example purposes only. The placement of sensors on the truck and trailer will be determined in design, as well as the distances for the predetermined zones, and the type of sensors to use.

Distances/Zones/Etc.

Some preferred distances/zones/etc. are as follows, although they should not be considered limited or the only distances/zones/etc. used:

Top of Trailer—yellow zone, 6–12 inches. Red zone, 0–6 inches.

Lane Changing—6 feet range for all sensors on the turning side of the trailer, and the sensors on the back side of the tractor. If there is no object in the 6 feet zone, the green lights will appear. If there is an object in the 6 feet zone, red lights, accompanied by voice command will alert the driver not to change lanes.

City Mode—Red zone, 3 feet.

Maneuvering—Yellow zone, 6 feet. Red zone, w/voice warning 4 feet Red zone, w/voice command 18 inches.

Backing—Red zone w/voice warning, 8 feet. Red zone w/voice command 3 feet.

Stop and Go—Red zone w/voice warning 6 feet.

These distances have been determined with reaction time in mind.

The distances for the lights that represent objects on the screen can be variable in design, as well as the type of light to use, and the type of screen to use.

The type of device used to measure speed for parts 6 and 10 can be variable in design, but could be linked to the speedometer as known in the art.

Actual shape of the unit will be determined in design. One preferred shape of the unit is rectangular or square.

Other miscellaneous features may also be used with the present invention. As an example, a dimmer feature may be used which allows for dim or bright readouts from the device. Volume may also be controlled. An automatic signal may also be provided which indicates that one or more of the sensors is not working. The screen of the apparatus may show where the faulty sensor is.

The display device could be mounted as a factory item or on a swivel to allow for easy adjustment for viewing as desired. Finally, a decal (e.g. a rear decal) could be used which would indicate to the public that the vehicle was equipped with safety sensors for enhanced driver safety.

This device can also benefit smaller delivery trucks, not only tractor trailers.

A single sensor could be used to sense all the desired ranges (e.g. the three ranges), or separate sensors (e.g. three sensors) could be used to sense particular ranges.

Examples

The following are some examples of operating of the application.

Top of Trailer Example—Driver is coming upon an overpass, to safely judge the distance between the top of the trailer and the overpass, he manually activates the top sensors by turning them on (top sensor switch 30). The sensors will then measure the distance between the overpass and the top of the trailer, for the length of the trailer up to 12 inches. If the overpass is in the 12 inch zone, the yellow lights will come on, accompanied by a voice warning cautioning the driver of the object in the path of the trailer. At the same time, the driver will see the actual inches (from 12 to 1 inch) between the top of the trailer and the overpass on the digital display 20. As the driver proceeds under the overpass, if he comes within a 6 inch zone, the red lights will light up, accompanied by a voice command, alerting the driver of the possibility of contact if he precedes. At this point, if the driver proceeds, the computer will register a possible event on the top of the trailer. However, the driver still has a 6 inch clearance after the voice command, which can be monitored by the digital display 20.

Lane Changing Example—Driver is traveling interstate, he turns on his right indicator. At this point, the sensors for the right side of the truck are activated. If there is no object in the 6 foot zone, the green bead of lights, and the green blinker light on the right side of the screen will blink with normal blinking sound, if there is an object in the 6 foot zone, the red bead of lights, and the red blinker on the right side will light up accompanied by a low pitched beeping and voice command alerting the driver not to change lanes.

Backing Example—Driver is backing into a loading dock or door. When the driver places the vehicle in reverse, the sensors on the back of the truck, the sensors will be activated. When the driver comes within 8 feet of the dock or door, the screen will come on, showing a red light or diode in the rear of the truck, (which represents the object being measured) and the digital display 21 will show the footage from the truck to the dock or door. A large blinking light at the bottom of the screen will also come on. As the driver continues to approach the dock or door, when he comes within 3 feet of the dock or door, he will then see a red diode or light that represents the dock or door at 3 feet and will hear a voice command alert him to stop the truck before contact is made. He may then monitor footage by the digital display 21.

Conclusion

Therefore it may be seen that the present invention provides an improvement over the prior art by providing a vehicle safety sensor system which includes a display device which operates in conjunction with at least one sensor device.

While this invention has been described in specific detail with reference to the disclosed embodiments, it will be understood that many variations and modifications may be effected within the spirit and scope of the invention as described in the appended claims.

That which is claimed:

1. A vehicle safety system, said system for use with a vehicle for use by an operator on a roadway, said vehicle having turn signal indicators for allowing said operator to indicate intentions for left and right turns, said vehicle safety system comprising:

at least one presence sensor attached proximate the exterior of said vehicle for sensing the presence of a remote object a distance beside said vehicle and for providing a presence sensor signal if such an object is sensed;

a signal processing and generating unit for receiving and processing said presence sensor signal from said presence sensor and generating an advisory signal to said operator in response to said receipt of said presence sensor signal by said unit; and a switch having an ON and OFF position, said switch being operably associated with said vehicle turn signal indicators, said switch when in said ON position allowing an advisory signal to reach said operator if an object is sensed by said presence sensor, said switch when in said OFF position not allowing said advisory signal to reach said operator despite the presence of said same object, and said switch being operably associated with said turn signal indicators such that said switch is placed in its ON position when said operator activates at least one said turn signal indicator and such that said switch is turned OFF when said turn signal indicator is deactivated.

2. The vehicle safety system of claim 1, wherein said advisory signal includes a visual warning which can be seen by said operator.

3. The vehicle safety system of claim 2, wherein said advisory signal also includes an audible warning signal.

4. The vehicle safety system of claim 3, wherein said audible warning simulates a human voice advising said operator not to change lanes.

5. A vehicle safety system, said system for use with a vehicle for use by an operator on a roadway, said vehicle safety system comprising:

at least one presence sensor attached proximate the exterior of said vehicle for sensing the presence of a remote object a distance from said vehicle and for providing a presence sensor signal if such an object is sensed;

at least one speed sensor for determining the speed of said vehicle and for providing a low speed signal when said speed has fallen below a predetermined value; and     a signal processing and generating unit for processing said signals from both said presence sensor and said speed sensor, said unit configured for selectively generating an advisory signal to said operator in response to receipt by said unit of said presence sensor signal, said unit selectively allowing said generated advisory signal to reach said operator in response to said low speed signal from said low speed sensor being received by said unit.

6. A vehicle safety system, said system for use with a vehicle for use by an operator on a roadway, said vehicle safety system comprising:

at least one presence sensor attached proximate the exterior of said vehicle for sensing the presence of a remote object a distance from said vehicle and for providing a sensor signal if such an object is sensed;

at least one speed sensor for determining the speed of said vehicle and for providing a low speed signal when said speed has fallen below a predetermined value; and     a signal processing and generating unit for processing said signals from said presence sensor and said speed sensor and generating two modes of advisory signals to said operator depending on whether or not said low speed signal is received by said processing unit, the first mode being a CITY MODE if said low speed signal is received, and the second mode being a NORMAL mode if said low speed signal is not received by said processing unit.

7. The vehicle safety system as claimed in claim 6, wherein when said vehicle is in said NORMAL mode, a first advisory signal is given for a first event and a second advisory signal is given for a second event, and when said vehicle is in said CITY MODE mode, a second advisory signal is not given, and said first advisory signal is given for said second event.

8. The vehicle safety system as claimed in claim 6, wherein said first advisory signal, given for said first event, is a Voice Warning, and said second advisory signal, given for said second event, is a Voice Command.

9. A vehicle safety system, said system for use with a vehicle for use by an operator on a roadway, said vehicle safety system comprising:

a plurality of presence sensors attached proximate at least two outside locations on said vehicle, each presence sensor configured for sensing the presence of a remote object a distance from said vehicle and for providing a sensor signal if such an object is sensed;

a signal processing and generating unit for processing at least one sensor signal from said sensors and generating an advisory signal to said operator in response to said sensor signal; and     a manual switch having an ON and an OFF position for use by said operator, said manual switch configured when in said ON position to allow said operator to allow for continuous sensing by said presence sensors and for generation of said advisory signal to said operator in response to said sensor signal, and said manual switch configured when in said OFF position to prevent generation of said advisory signal, either alone or in combination with the preclusion of any sensor signal.

10. A vehicle safety system, said system for use with a vehicle for use by an operator on a roadway, said vehicle safety system comprising:

a presence sensor located proximate the exterior of said vehicle, said sensor configured for sensing the presence of a remote object a distance from said vehicle and for providing a sensor signal if such an object is sensed;

a signal processing and generating unit for processing said signals from said presence sensor and for generating an advisory signal to said operator in response to said presence sensor signal; and     a storage device for storing and logging a plurality of said advisory signals for later review.

11. A vehicle safety system, said system for use with a vehicle for use by an operator on a roadway, said vehicle safety system comprising:

at least one presence sensor attached proximate the exterior of said vehicle for sensing the presence of a remote object a distance from said vehicle and for providing a presence sensor signal if such an object is sensed;

at least one direction sensor for determining the forward or reverse direction of said vehicle and for providing a reverse direction signal when said vehicle is moving in reverse;

a signal processing and generating unit for processing said signals from said two sensors and generating two modes of advisory signals to said operator depending on whether or not said reverse direction signal is received by said unit, the first mode being a REVERSE MODE if said reverse direction signal is received by said unit, and the second mode being a NORMAL MODE if said reverse direction signal is not received by said unit.

12. The vehicle safety system as claimed in claim 11, wherein said sensor is located on the rear of said vehicle, and wherein a simulated voice command is provided in response to a particular event only in said REVERSE MODE.

13. A vehicle safety system, said system for use with a vehicle for use by an operator on a roadway, said vehicle having a turn signal indicator, said vehicle safety system comprising:

at least one presence sensor attached proximate the exterior of said vehicle for sensing the presence of a remote object a distance from said vehicle and for providing a presence sensor signal if such an object is sensed;

at least one speed sensor for determining the forward speed of said vehicle and for providing a low forward speed signal when said speed has gone below a predetermined value;

at least one direction sensor for determining the forward or reverse direction of said vehicle and for providing a reverse direction signal when said vehicle is moving in reverse;

a signal processing and generating unit for processing at least one sensor signal from said sensors and generating an advisory signal to said operator in response to said sensor signal, and for processing said signals from said sensors and generating various modes of advisory signals to said operator depending on whether or not said low forward speed signal is received by said unit and depending on whether or not said reverse direction signal is received by said unit, said various modes including a CITY MODE if said low forward speed signal is received, a REVERSE MODE if said reverse direction signal is received, and a NORMAL MODE if said low speed signal is not received and said reverse direction signal is not received;

a switch having an ON and an OFF position, said ON position allowing an advisory signal to reach said operator if an object is sensed by said presence sensor, and said OFF position not allowing said advisory signal to reach said operator despite the presence of said same object, said switch being placed in its ON position when said operator activates said turn signal indicator and OFF when said turn signal indicator is deactivated;

a manual switch having an ON and an OFF position for use by said operator, said manual switch configured when in said ON position to allow said operator to allow for continuous sensing by said presence sensors and for generation of said advisory signal to said operator in response to said sensor signal, and said manual switch configured when in said OFF position to prevent generation of said advisory signal, to preclude any sensor signal, or to so prevent and preclude in combination; and a memory storage device for storing said logging a plurality of advisory signals for later review.

14. The vehicle safety system as claimed in claim 13, wherein when said vehicle is in said NORMAL MODE, a first advisory signal is given for a first event and a second advisory signal is given for a second event, and when said vehicle is in said CITY MODE mode, a second advisory signal is not given, and a first advisory signal is given for a second event.

15. The vehicle safety system as claimed in claim 14, wherein said first advisory signal is a Voice Warning, and wherein said second advisory signal is a Voice Command.

* * * * *